US010013912B2

(12) United States Patent
Kim et al.

(10) Patent No.: US 10,013,912 B2
(45) Date of Patent: Jul. 3, 2018

(54) DISPLAY DEVICE HAVING A BENT DISPLAY PART AND METHOD OF DRIVING THE SAME

(71) Applicant: Samsung Display Co., Ltd., Yongin, Gyeonggi-Do (KR)

(72) Inventors: Kyuseok Kim, Yongin-si (KR); Dajeong Lee, Busan (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/793,367

(22) Filed: Jul. 7, 2015

(65) Prior Publication Data

US 2016/0071457 A1 Mar. 10, 2016

(30) Foreign Application Priority Data

Sep. 4, 2014 (KR) ........................ 10-2014-0117821

(51) Int. Cl.
*G06F 5/00* (2006.01)
*G09G 3/3208* (2016.01)
*G09G 3/3233* (2016.01)
*G09G 3/20* (2006.01)

(52) U.S. Cl.
CPC ......... *G09G 3/3208* (2013.01); *G09G 3/2003* (2013.01); *G09G 3/3233* (2013.01); *G09G 2300/0842* (2013.01); *G09G 2320/028* (2013.01); *G09G 2320/0233* (2013.01); *G09G 2320/0242* (2013.01); *G09G 2320/0271* (2013.01); *G09G 2320/0666* (2013.01); *G09G 2320/0686* (2013.01); *G09G 2340/14* (2013.01); *G09G 2380/02* (2013.01)

(58) Field of Classification Search
CPC ............. G09G 3/3208; G09G 2380/02; G09G 2320/0666; G09G 2320/0686
USPC .......................................................... 345/690
See application file for complete search history.

(56) References Cited

U.S. PATENT DOCUMENTS 8,928,619 B1 * 1/2015 Cho ...................... G06F 1/1652 345/173
2009/0046948 A1 * 2/2009 Ono ........................ G06T 11/40 382/284
2013/0215041 A1 * 8/2013 Kim ...................... G06F 3/0487 345/173

(Continued)

FOREIGN PATENT DOCUMENTS

EP 2793214 A1 10/2014
JP 2009-063701 3/2009

(Continued)

*Primary Examiner* — Jonathan Blancha
(74) *Attorney, Agent, or Firm* — Innovation Counsel LLP

(57) ABSTRACT

A display device includes an organic light emitting display panel and a control module. The organic light emitting display panel includes a first display part and a second display part bent from the first display part with respect to a bending axis and configured to display a gradation image. The control module is configured to control images displayed in the first and second display parts. At least one of color, brightness, and chroma of the gradation image is varied along a direction crossing the bending axis of the organic light emitting display panel. A user perceives that an image distortion caused by a shape of the organic light emitting display panel is caused by the gradation image.

19 Claims, 11 Drawing Sheets

(56) References Cited

U.S. PATENT DOCUMENTS

| | | | | |
|---|---|---|---|---|
| 2014/0009449 | A1 * | 1/2014 | Jang | G09G 3/00 345/204 |
| 2014/0015743 | A1 * | 1/2014 | Seo | G06F 1/1694 345/156 |
| 2014/0118319 | A1 | 5/2014 | Jeon | |
| 2014/0131679 | A1 * | 5/2014 | Lee | H01L 51/5265 257/40 |
| 2014/0160078 | A1 | 6/2014 | Seo et al. | |
| 2014/0184758 | A1 * | 7/2014 | Lee | H04N 13/0495 348/51 |
| 2015/0130686 | A1 * | 5/2015 | Hickman | G09G 3/20 345/5 |
| 2015/0253884 | A1 * | 9/2015 | Hwang | G06F 3/041 345/173 |

FOREIGN PATENT DOCUMENTS

| | | | |
|---|---|---|---|
| KR | 1020050057478 | A | 6/2005 |
| KR | 1020120135657 | A | 12/2012 |
| KR | 1020130123611 | A | 11/2013 |
| KR | 1020140054747 | A | 5/2014 |

* cited by examiner

DISPLAY DEVICE HAVING A BENT DISPLAY PART AND METHOD OF DRIVING THE SAME

CROSS-REFERENCE TO RELATED APPLICATION

This U.S. non-provisional patent application claims priority under 35 U.S.C. § 119 of Korean Patent Application No. 10-2014-0117821, filed on Sep. 4, 2014, the contents of which are hereby incorporated by reference in its entirety.

BACKGROUND

1. Field of disclosure

The present disclosure relates to a display device and a method of driving the same. More particularly, the present disclosure relates to a display device partially bent and a method of driving the display device.

2. Description of the Related Art

A flat panel display device has been developed to replace a cathode ray tube display device having a relatively large thickness and high power. As the flat panel display device, various display devices, such as a liquid crystal display device, a plasma display device, an organic light emitting display device, an electrophoretic display device, etc., have been wide used.

The organic light emitting display device has a microcavity structure to improve a light efficiency thereof. A wavelength of a light exiting from the organic light emitting display device is determined depending on a resonant length.

SUMMARY

The present disclosure provides a curved display device having improved display quality.

The present disclosure provides a method of driving the curved display device. Embodiments of the inventive concept provide a display device including an organic light emitting display panel and a control module. The organic light emitting display panel includes a first display part and a second display part bent from the first display part with respect to a bending axis and configured to display a gradation image. The control module is configured to control images displayed in the first and second display parts. At least one of color, brightness, and chroma of the gradation image is varied along a direction crossing the bending axis of the organic light emitting display panel.

Each of the color, brightness, and chroma of the gradation image is uniform in a direction substantially parallel to the bending axis of the organic light emitting display panel. The gradation image is a background image of the second display part.

The second display part is further configured to display an icon image. The color of the gradation image is varied from a first color to a second color having a wavelength shorter than a wavelength of the first color as a distance from the bending axis of the organic light emitting display panel increases.

The color of the gradation image is varied from a first color to a second color having a wavelength longer than a wavelength of the first color as a distance from the bending axis of the organic light emitting display panel increases.

The chroma of the gradation image increases as a distance from the bending axis of the organic light emitting display panel increases.

The brightness of the gradation image decreases as a distance from the bending axis of the organic light emitting display panel increases.

The first display part is configured to display a background image and an icon image. The control module is configured to set the color of the gradation image on the basis of a color of the background image of the first display part.

The control module is configured to set the color of the gradation image to allow the color of the gradation image to have a wavelength shorter than a wavelength of the background image of the first display part. The color of the background image of the first display part is a white color and the color of the gradation image is a blue color.

The background image of the first display part has a first color that is uniform, a uniform brightness, and a uniform chroma, and the color of the gradation image is varied from the first color to a second color having a wavelength shorter than a wavelength of the first color as a distance from the bending axis of the organic light emitting display panel increases.

The background image of the first display part has a first color that is uniform, a uniform brightness, and a uniform chroma, and the color of the gradation image is varied from the first color to a second color having a wavelength longer than a wavelength of the first color as a distance from the bending axis of the organic light emitting display panel increases.

The first display part comprises a flat display surface, the second display part comprises a rounded display surface, and the first display part has an area greater than an area of the second display part.

Embodiments of the inventive concept provide a method of driving a display device, including displaying a first background image in a first display part and displaying a gradation image in the second display part as a second background image. At least one of a color, a brightness, and a chroma of the gradation image is varied along a direction crossing a bending axis of an organic light emitting display panel of the display device.

The method further includes setting the color of the gradation image on the basis of a color of the first background image.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION

Figure 1:
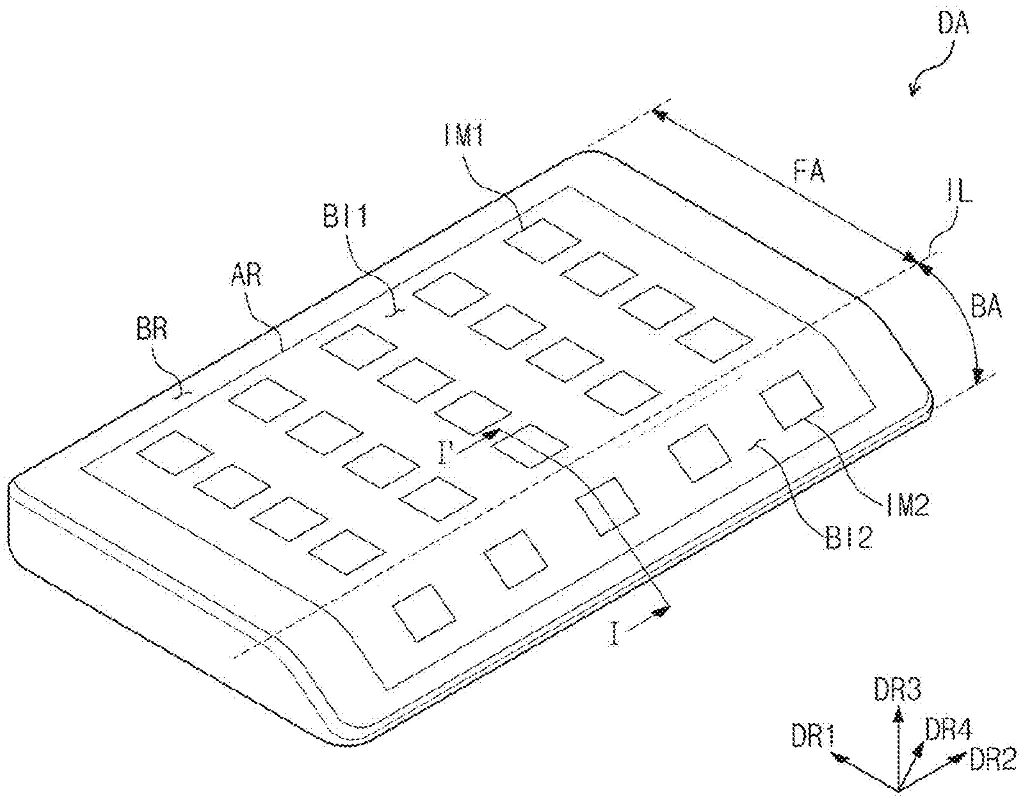
FIG. 1 is a perspective view showing a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

Figure 2:
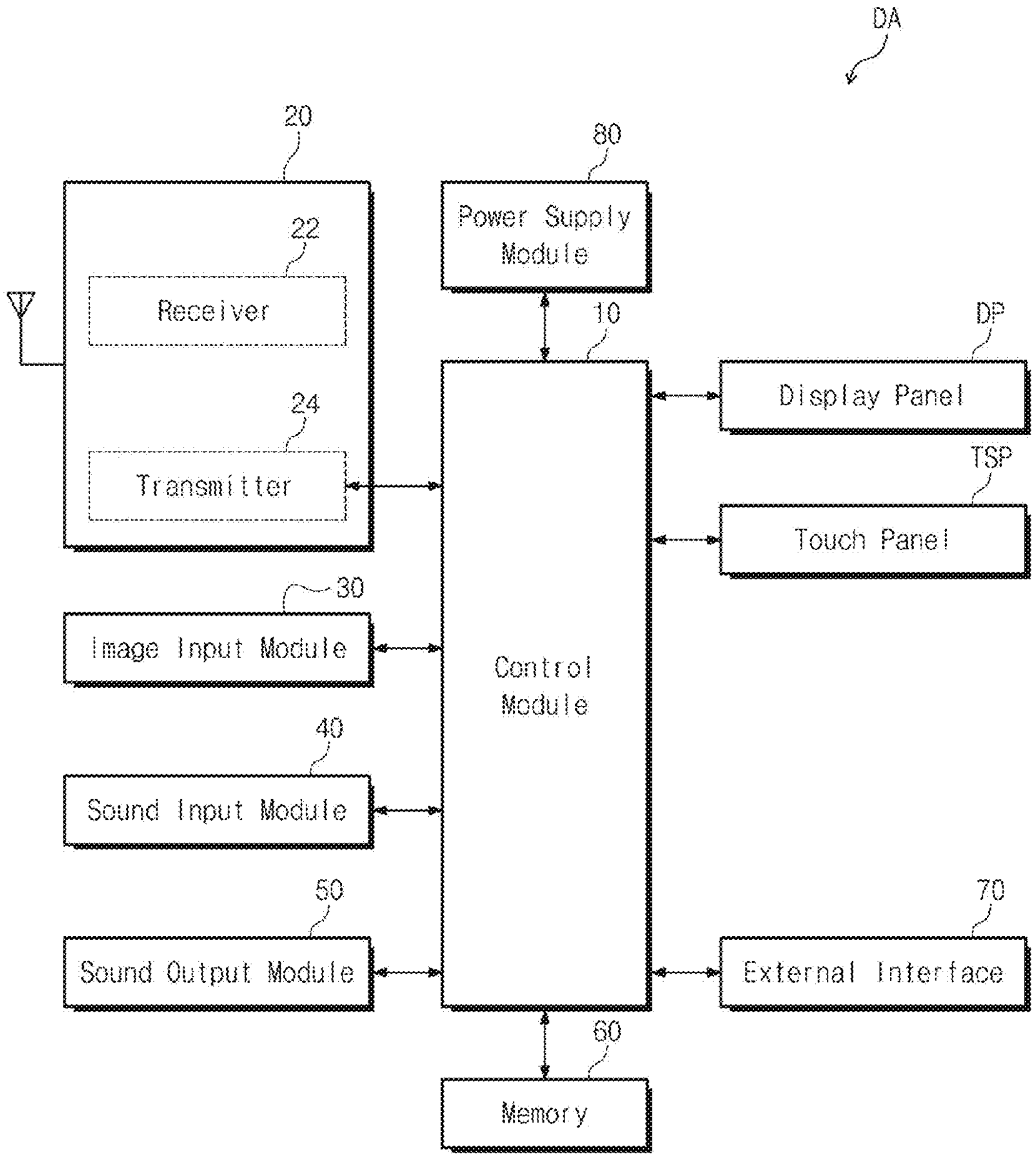
FIG. 2 is a block diagram showing a display device according to an exemplary embodiment of the present disclosure.

FIG. 1 is a perspective view showing a display device DA according to an exemplary embodiment of the present disclosure and FIG. 2 is a block diagram showing the display device DA according to an exemplary embodiment of the present disclosure. Hereinafter, the display device DA according to an exemplary embodiment of the present disclosure will be described in detail with reference to FIGS. 1 and 2.

FIG. 1 shows a mobile phone as an example of the display device DA, but the display device DA should not be limited to the mobile phone. The display device DA according to the present exemplary embodiment may be applied to a large-sized electronic item, such as a television set, an outdoor billboard, etc., and a small and medium-sized electronic item, such as a personal computer, a notebook computer, a personal digital assistant, a navigation unit, a game unit, a mobile electronic device, a wrist-type electronic device, a camera, etc., but it should not be limited thereto or thereby.

Referring to FIG. 1, the display device DA includes a three-dimensional (3D) display surface. To explain the 3D display surface, first, second, third, and fourth directions DR1, DR2, DR3, and DR4 are shown in FIG. 1. The 3D display surface is perceived by a user as a two-dimensional (2D) display surface on a front surface of the display device DA. The first and second directions DR1 and DR2 define the 2D display surface. The third direction DR3 indicates a thickness direction of the display device DA, a normal line direction of the 2D display surface, or a normal line direction of a first display surface FA described later. The fourth direction DR4 indicates a front surface direction of a second display surface BA described later or a normal line direction of the second display surface BA.

The first and second display surfaces FA and BA display information to different directions from each other. The second display surface BA is bent from and extends from the first display surface FA. The reason that the display device DA includes the 3D display surface is that a display panel DP (refer to FIG. 3) is bent. This will be described in detail later.

In FIG. 1, the display device DA includes two display surfaces FA and BA, but the number of the display surfaces of the display device DA should not be limited to two.

The first and second display surfaces FA and BA include a display area AR in which images IM1, IM2, BI1, and BI2 are displayed and a bezel area BR disposed adjacent to the display area AR. The bezel area BR is omitted or has a small size that may not be perceived by the user. The images IM1, IM2, BI1, and BI2 displayed in the first and second display surfaces FA and BA are determined depending on a selection of the user or an operation mode of the display device DA.

The first display surface FA displays a first icon image IM1 and the second display surface BA displays a second icon image IM2. The first icon image IM1 may be, but is not limited to, an icon used to execute a game or internet application and the second icon image IM2 may be, but is not limited to, an icon used to carry out a phone function. The first and second icon images IM1 and IM2 may not be displayed by a setting of the user or the operation mode of the display device DA.

The first display surface FA displays a first background image BI1 and the second display surface BA displays a second background image BI2. The first background image BI1 is selected from images previously stored in a memory in the mobile phone. The first background image BI is a solid color image, an image taken by a camera, or a graphic image.

The second background image BI2 includes a gradation image. The gradation image is defined by an image in which at least one of color, brightness, and chroma is gradually varied in the first direction DR1 crossing a bending axis IL. The bending axis IL is defined as a boundary line between a first display part FP and a second display part BP bent from the first display part FP. The color, brightness, and chroma of the gradation image may be constant in a direction substantially parallel to the bending axis IL. The gradation image will be described in detail later.

Referring to FIG. 2, the display device DA includes the display panel DP, a touch panel TSP, a control module 10, a wireless communication module 20, an image input module 30, a sound input module 40, a sound output module 50, a memory 60, an external interface 70, and a power supply module 80. The elements of the display device DA are mounted on a circuit board or are electrically connected to each other through a flexible circuit board. The elements of the display device DA are disposed between a window member and a protective member, which are coupled to each other. A portion of the elements may be omitted.

The display panel DP generates an image corresponding to image data applied thereto. In the present exemplary embodiment, an organic light emitting display panel will be described as the display panel DP as a representative example. The display panel will be described in detail later. The touch panel TSP generates coordinate information about an input position. As the touch panel TSP, various touch panels, e.g., an electrostatic capacitive type touch panel, an electromagnetic induction type touch panel, etc., may be used.

The control module 10 controls the whole operation of the mobile phone. For instance, the control module 10 activates or inactivates the display panel DP and the touch panel TSP. In addition, the control module 10 controls the display panel DP, the image input module 30, the sound input module 40, and the sound output module 50 on the basis of a touch signal provided from the touch panel TSP. The control module 10 controls the images displayed in the first and second display surfaces FA and BA (refer to FIG. 1). The control module 10 provides the image data to the display panel DP to allow information indicated by the selection of the user to be displayed on the display panel DP. The control module 10 includes a processor and a driving IC.

The wireless communication module 20 transmits or receives a wireless signal to or from another terminal using a Bluetooth or WiFi connection. The wireless communication module 20 transmits or receives a sound signal using a normal communication channel. The wireless communication module 20 includes a receiver 22 that demodulates a signal applied thereto and a transmitter 24 that modulates a signal, which is to be transmitted.

The image input module 30 processes an image signal and converts the image signal to the image data that may be displayed in the display panel DP. The sound input module 40 receives an external sound signal using a microphone in a recording mode or a sound recognition mode and converts the sound signal to electrical sound data. The sound output module 50 converts and outputs the sound data provided from the wireless communication module 20 or the sound data stored in the memory 60.

The external interface 70 serves as an interface for an external charger, a wire/wireless data port, and a card socket, e.g., a memory card, an SIM/UIM card, etc. The power supply module 80 supplies a power voltage for the whole operation of the mobile phone.

Figure 3:
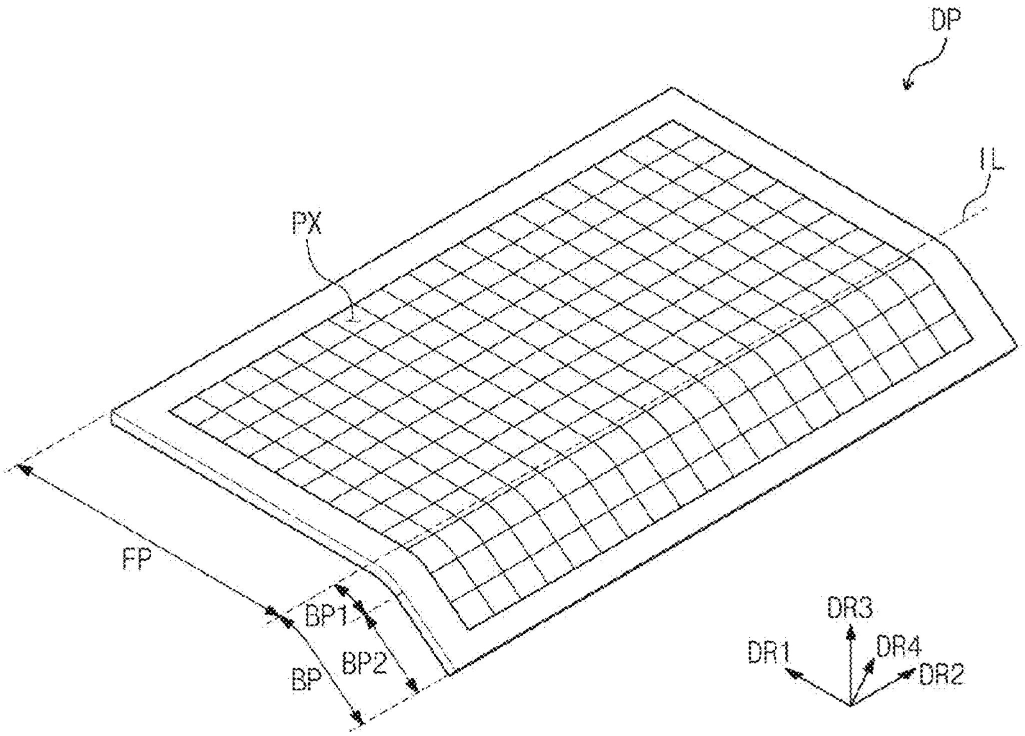
FIG. 3 is a perspective view showing a display panel according to an exemplary embodiment of the present disclosure.
Figure 4:
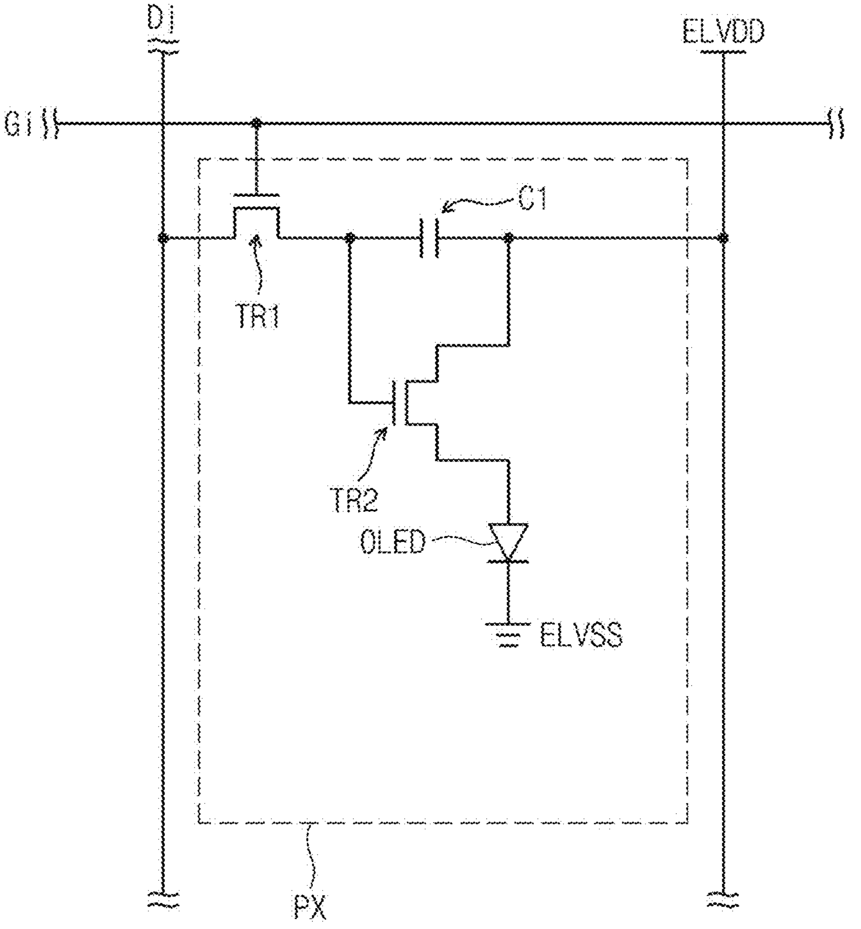
FIG. 4 is an equivalent circuit diagram showing a pixel according an exemplary embodiment of the present disclosure.
Figure 5:
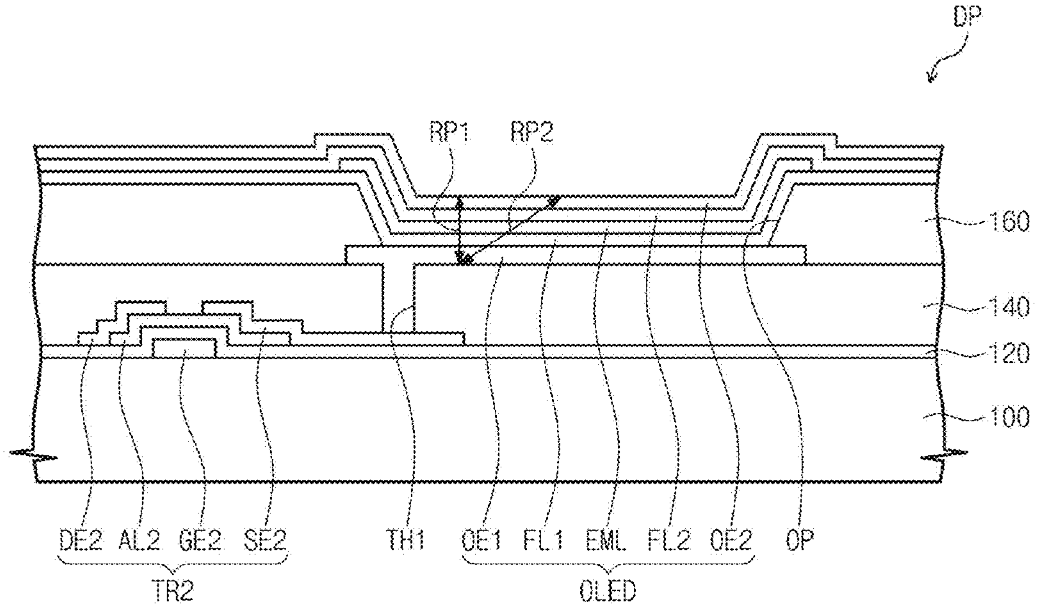
FIG. 5 is a cross-sectional view showing a pixel according to an exemplary embodiment of the present disclosure.
Figure 6:
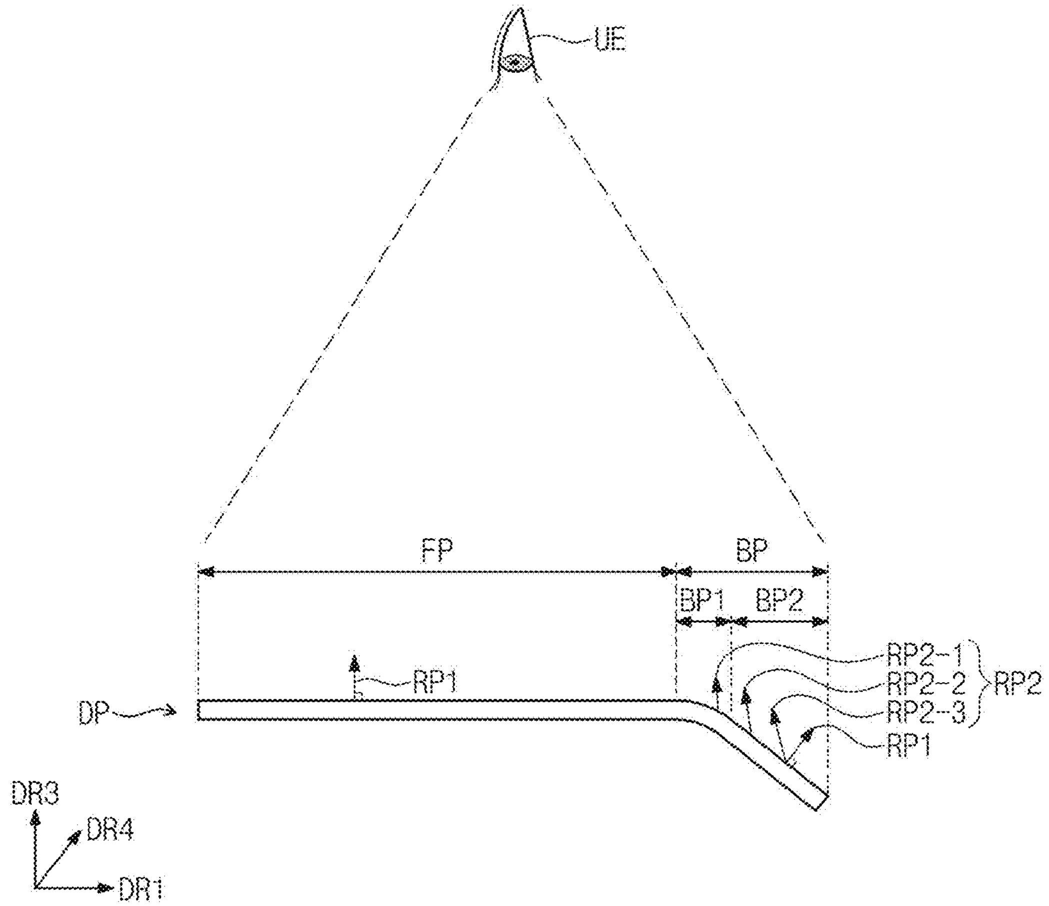
FIG. 6 is a cross-sectional view showing paths of light perceived by a user in accordance with a position of a display panel according to an exemplary embodiment of the present disclosure.

FIG. 3 is a perspective view showing a display panel according to an exemplary embodiment of the present disclosure, FIG. 4 is an equivalent circuit diagram showing a pixel according an exemplary embodiment of the present disclosure, FIG. 5 is a cross-sectional view showing a pixel according to an exemplary embodiment of the present disclosure, and FIG. 6 is a cross-sectional view showing paths of light perceived by a user in accordance with a position of a display panel according to an exemplary embodiment of the present disclosure.

Referring to FIG. 3, the display panel DP is partially bent. The display panel DP includes a first display part FP and a second display part BP extending from the first display part FP. The first and second display parts FP and BP respectively provide the first and second display surfaces FA and BA shown in FIG. 1.

The first display part FP provides the first display surface FA that is flat. The second display part BP provides a rounded display surface and a flat display surface. The rounded display surface is provided from a rounded part BP1 disposed adjacent to the bending axis IL and the flat display surface is provided from a flat part BP2 connected to the rounded part BP1.

Meanwhile, the second display part BP should not be limited to a specific shape as long as the second display part BP is bent from the first display part FP. For instance, the second display part BP may have a round shape from an overall view. This will be described in detail with reference to FIGS. 7A and 7B.

The display panel DP includes a plurality of pixels PX arranged in an area overlapped with the display area AR (refer to FIG. 1). The pixels PX are not arranged in an area overlapped with the bezel area BR of the display panel DP and lines used to apply signals to the pixels PX are arranged in the area overlapped with the bezel area BR.

The first display part FP has an area greater than that of the second display part BP. When the second display surface BA is unfolded, the display panel DP has a substantially rectangular shape.

Referring to FIG. 4, the pixel PX is connected to an i-th gate line Gi and a j-th data line Dj. The pixel PX is operated in response to a gate signal applied to the i-th gate line Gi. The pixel PX includes a first transistor TR1, a second transistor TR2, a capacitor C1, and an organic light emitting diode OLED.

The pixel PX receives a first source voltage ELVDD and a second source voltage ELVSS, which have different levels from each other. The pixel PX receives the first and second source voltages ELVDD and ELVSS and generates a light corresponding to a data signal applied to the j-th data line Dj.

The first transistor TR1 includes a control electrode connected to the i-th gate line Gi, an input electrode connected to the j-th data line Dj, and an output electrode. The first transistor TR1 outputs the data signal provided through the j-th data line Dj in response to the gate signal applied to the i-th gate line Gi.

The capacitor C1 includes a first electrode connected to the first transistor TR1 and a second electrode applied with the first source voltage ELVDD. The capacitor C1 is charged with a voltage corresponding to the data signal provided from the first transistor TR1.

The second transistor TR2 includes a control electrode GE2 (see FIG. 5) connected to the output electrode of the first transistor TR1 and the first electrode of the capacitor C, an input electrode DE2 (see FIG. 5) applied with the first source voltage ELVDD, and an output electrode SE2 (see FIG. 5), also called a source electrode SE2, connected to the organic light emitting diode OLED. The second transistor TR2 controls a driving current flowing through the organic light emitting diode OLED in response to the voltage charged in the capacitor C1. Meanwhile, a configuration of the circuit used to control the organic light emitting diode OLED is changed as long as the pixel PX includes the organic light emitting diode OLED. In FIG. 4, an N-type transistor is shown as the first and second transistors TR1 and TR2, but a P-type transistor may be used as the first and second transistors TR1 and TR2.

Referring to FIG. 5, the control electrode GE2 of the second transistor TR2 is disposed on a base substrate 100. A first insulating layer 120 is disposed on the base substrate 100 to cover the control electrode GE2 of the second transistor TR2. The first insulating layer 120 includes an organic layer and/or an inorganic layer. A semiconductor layer AL2 is disposed on the first insulating layer 120. The semiconductor layer AL2 includes amorphous silicon, polysilicon, or metal oxide semiconductor.

The input electrode DE2 and the source electrode SE2 of the second transistor TR2 are disposed to overlap with the semiconductor layer AL2. The input electrode DE2 and the source electrode SE2 of the second transistor TR2 are spaced apart from each other. A second insulating layer 140 is disposed on the first insulating layer 120 to cover the input electrode DE2 and the source electrode SE2 of the second transistor TR2. The second insulating layer 140 includes an organic layer and/or an inorganic layer. FIG. 5 shows a bottom gate type transistor, but it should not be limited thereto or thereby. That is, a top gate type transistor may be used.

The organic light emitting diode OLED is disposed on the second insulating layer 140. The organic light emitting diode OLED includes a first electrode OE1, a first common layer FL1, an organic light emitting layer EML, a second common layer FL2, and a second electrode OE2, which are sequentially stacked on the second insulating layer 140. The first electrode OE1 is connected to the output electrode SE2 through a contact hole TH1 formed through the second insulating layer 140. A third insulating layer 160 is disposed on the second insulating layer 140 and the third insulating layer 160 has an opening OP formed therethrough. The organic light emitting diode OLED is disposed in the opening OP.

The organic light emitting diode OLED has a microcavity structure to improve an emission efficiency of the external light. The light emitted from the organic light emitting diode OLED has a specific wavelength amplified by an interference effect. One of the first and second electrodes OE1 and OE2 of the organic light emitting diode OLED includes a semi-transmissive metal layer and the other of the first and second electrodes OE1 and OE2 of the organic light emitting diode OLED includes a reflective metal layer. The semi-transmissive metal layer has a thickness of about few nanometers to about tens of nanometers and includes silver (Ag), aluminum (Al), gold (Au), nickel (Ni), magnesium (Mg), or an alloy thereof. The electrode including the semi-transmissive metal layer may further include a transparent electrode layer with a high work function.

The electrode including the reflective metal layer may include the transparent electrode layer with the high work function and a dielectric reflective layer. The organic light emitting diode OLED is operated in a front surface light emitting mode or a rear surface light emitting mode according to the arrangement of the semi-transmissive metal layer and the reflective metal layer.

The first common layer FL1 includes a hole injection layer. The first common layer FL1 may further include a hole transport layer disposed on the hole injection layer. The second common layer FL2 includes an electron injection layer. The second common layer FL2 may further include an electron transport layer disposed between the organic light emitting layer EML and the electron injection layer.

The resonant length, i.e., a distance between the first electrode OE1 and the second electrode OE2, may be controlled according to wavelength of the light emitted from the organic light emitting diode OLED. To control the resonant length, a thickness of each of the first and second common layers FL1 and FL2 may be varied. The organic light emitting diode OLED may further include a functional layer to control the resonant length.

The organic light emitting diode OLED includes a material that generates a white light. When the resonant length is controlled to correspond to the pixels PX, the organic light emitting diode OLED emits a red light, a green light, or a blue light. The organic light emitting layer EML includes a material that generates the red light, the green light, or the blue light in accordance with the pixels PX. The wavelength of the red light, the green light, or the blue light emitted from the organic light emitting diode OLED compared to the red light, the green light, or the blue light emitted from the organic light emitting layer EML may be shifted by controlling the resonant length.

As shown in FIG. 5, the resonant length according to a first path RP1 is different from the resonant length according to a second path RP2, and thus the wavelength of the light emitted through the first path RP1 is different from the wavelength of the light emitted through the second path RP2. As the resonant length become longer, the wavelength of the light is shifted to a short wavelength. The microcavity structure of the organic light emitting diode OLED is designed by taking the resonant length according to the first path RP1, i.e., the direction substantially vertical to the display panel DP, into consideration.

As shown in FIG. 6, a user UE perceives the light (or image) provided from the display panel DP at a position on the third direction DR3. The user UE receives the light exiting through the first path RP1 from the first display part FP, and the user UE receives the light exiting through the second path RP2 from the second display part BP. In particular, paths RP2-1, RP2-2, and RP2-3 of the light exiting from the second display part BP are different from each other according to the positions of the pixels PX (refer to FIG. 3). As the position of the pixels PX becomes far away from the bending axis IL (refer to FIG. 3) along the first direction DR1, the paths RP2-1, RP2-2, and RP2-3 become longer.

Accordingly, although the first and second display parts FP and BP generate the lights having the same wavelength, the user UE perceives that the lights generated by the first and second display parts FP and BP have different wavelengths from each other. Although the lights having the same wavelength are generated by the pixels of the second display part BP, the user UE perceives that the lights having different wavelengths from each other are generated due to the distance between the bending axis IL and the pixels PX. Consequently, the bent display panel DP causes an image distortion, e.g., a color shift.

Figure 7A:
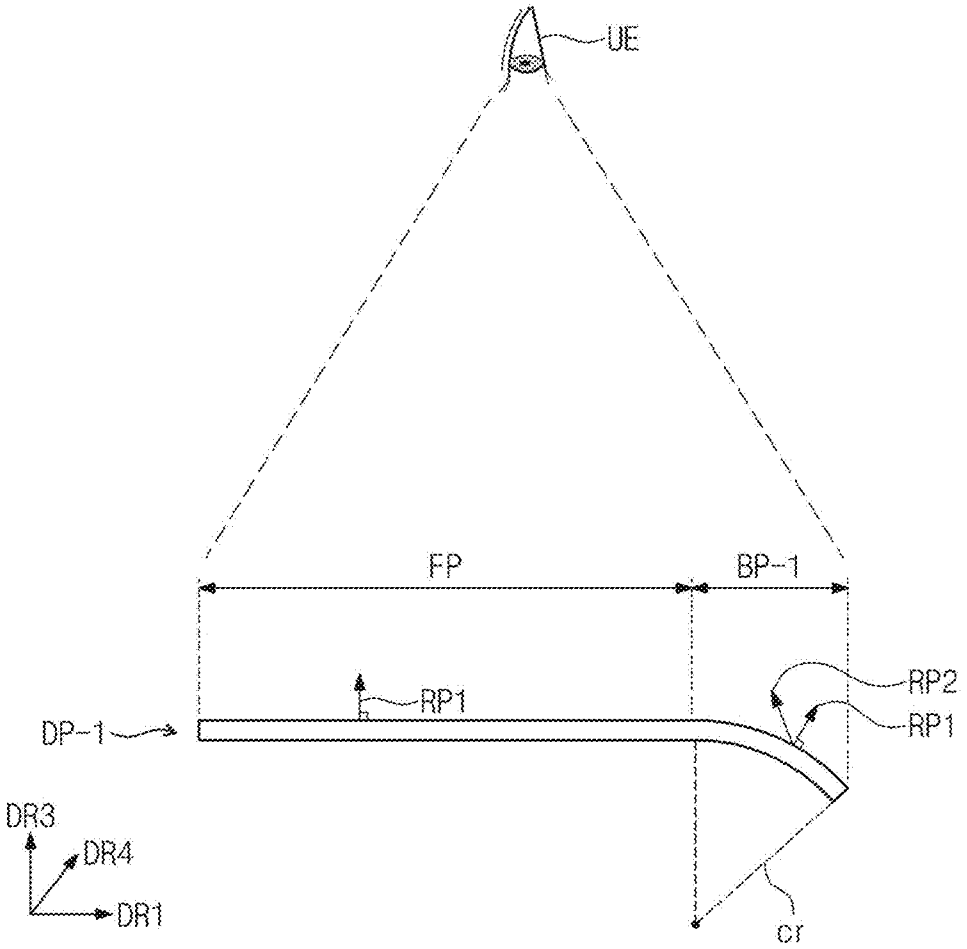
FIGS. 7A and 7B are cross-sectional views showing paths of light perceived by a user in accordance with a position of a display panel according to an exemplary embodiment of the present disclosure.
Figure 7B:
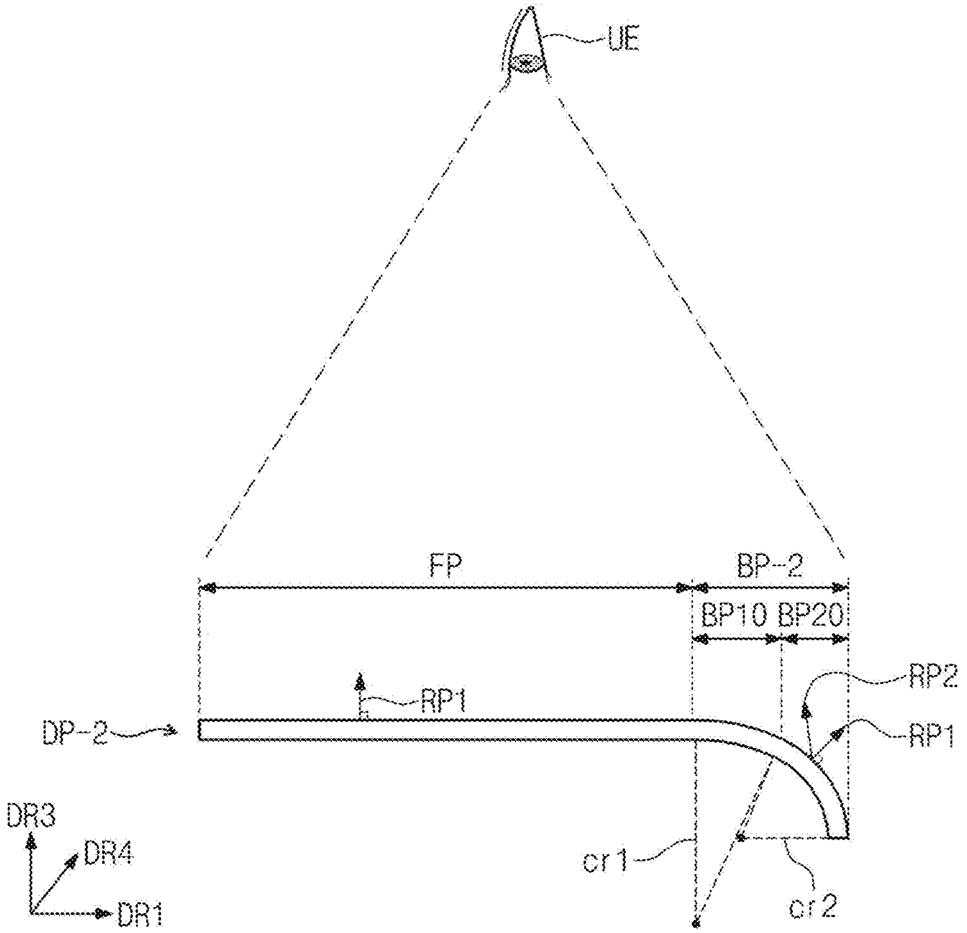

FIGS. 7A and 7B are cross-sectional views showing paths of lights perceived by the user in accordance with the position of the display panel according to an exemplary embodiment of the present disclosure.

Referring to FIGS. 7A and 7B, second display parts BP-1 and BP-2 of display panels DP-1 and DP-2 have a round shape from an overall view. The second display parts BP-1 and BP-2 having the round shape provide the light to the user LE through the second path RP2 longer than the first path RP1. Therefore, although the lights having the same wavelength are generated by the first display part FP and the second display parts BP-1 and BP-2, the user UE perceives that the lights generated by the first display part FP and the second display parts BP-1 and BP-2 have different wavelengths from each other.

As shown in FIG. 7A, the second display part BP-1 is bent at a predetermined radius of curvature cr (hereinafter, referred to as a radius curvature). The curvature cr is determined by a ratio of a width of the second display part BP-1 to a width of the first display part FP in the first direction DR1.

As shown in FIG. 7B, the second display part BP-2 includes a first round part BP10 bent at a first radius curvature cr1 and a second round part BP20 bent at a second radius curvature cr2. In FIG. 7B, the first radius curvature cr1 is greater than the second radius curvature cr2, but the shape of the second display part BP-2 should not be limited thereto or thereby. In addition, the second display part BP2 may further include a third round part having a third radius curvature different from the first and second radius curvatures.

Figure 8:
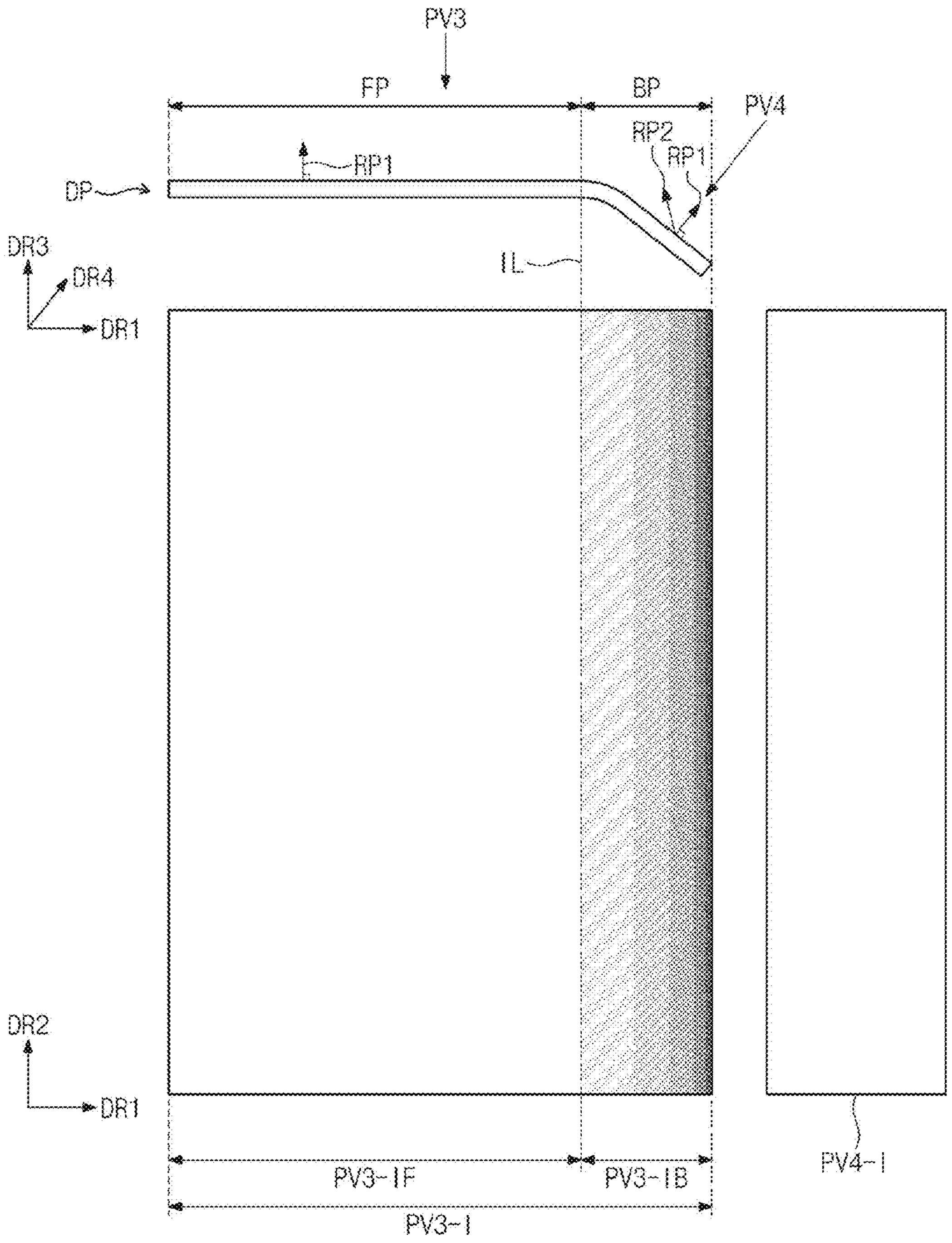
FIG. 8 is a view showing an image in accordance with a viewpoint of a user with respect to a display device according to a comparison example.
Figure 9:
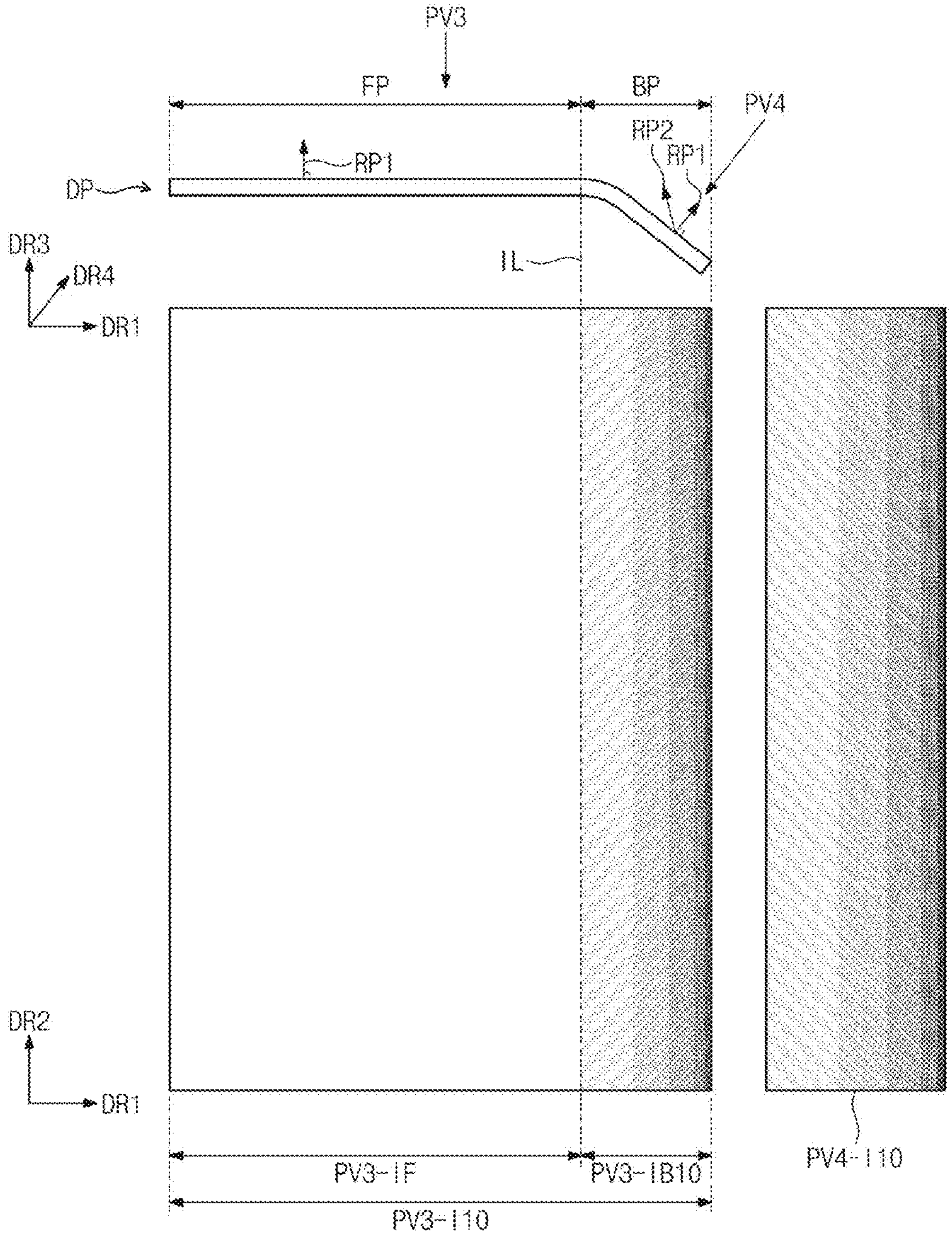
FIG. 9 is a view showing an image in accordance with a viewpoint of a user with respect to a display device according to an exemplary embodiment of the present disclosure.

FIG. 8 is a view showing an image in accordance with a viewpoint of a user with respect to a display device according to a comparison example and FIG. 9 is a view showing an image in accordance with a viewpoint of a user with respect to a display device according to an exemplary embodiment of the present disclosure. Hereinafter, a driving method of the display device, which is to compensate for the image distortion, will be described in detail with reference to FIGS. 8 and 9.

Images shown in FIGS. 8 and 9 represent the background images BI1 and BI2 (refer to FIG. 1), which do not include the icon images IM1 and IM2 (refer to FIG. 1).

Referring to FIG. 8, the display device according to the comparison example displays a uniform background image regardless of areas thereof. That is, the display device according to the comparison example displays a solid color background image, e.g., a white color, a red color, a yellow color, etc. The uniform background image has constant chroma and brightness regardless of the areas.

A first viewpoint image PV3-I represents an image perceived by the user at a first viewpoint PV3. The first viewpoint PV3 is defined on the third direction DR3. A second viewpoint image PV4-I represents an image perceived by the user at a second viewpoint PV4.

The second viewpoint PV4 is defined on the fourth direction DR4.

The first viewpoint image PV3-I includes different images according to the areas. A first portion image PV3-IF corresponding to the first display part FP is substantially the same image, i.e., the uniform solid color image, as the image displayed in the first display part FP.

However, a second portion image PV3-IB corresponding to the second display part BP is different from the image displayed in the second display part BP. The image displayed in the second display part BP is the same as the second viewpoint image PV4-I. The second display part BP displays the solid color image like the second viewpoint image PV4-I, but the solid color image displayed in the second display part BP is perceived by the user as the gradation image like the second portion image PV3-IB.

This is because the second portion image PV3-IB is more shifted to the short wavelength than the second viewpoint image PV4-I. As a distance from the bending axis IL increases on the first direction DR1, the second portion image PV3-IB is more shifted to the short wavelength. Thus, the second portion image PV3-IB is perceived as the gradation image. In particular, when the second display part BP has the round shape from an overall view, the second portion image PV3-IB is more shifted to the short wavelength along the first direction DR3.

For instance, when a white background image is displayed in the entire area of the display panel DP, the user perceives the first portion image PV3-IF as a white solid color image and the second portion image PV3-IB as a blue gradation image. This is because the white solid color image is shifted to the short wavelength at the first viewpoint PV3 even though the second display part BP displays the white solid color image. Consequently, the image distortion, in which the image is perceived as different images according to viewpoints, is caused by the bent shape of the display panel.

Referring to FIG. 9, the display device according to the present exemplary embodiment of the present disclosure may display different images according to areas thereof. The first display part FP displays a solid color background image and the second display part BP displays the gradation image. Here, the expression that the gradation image is displayed in the second display part BP should not be limited to that the gradation image is displayed in the entire surface of the second display part BP. The gradation image may have an area smaller than that of the second display part BP. In this case, a portion of the second display part BP does not display the gradation image and the solid color background image of the first display part FP is displayed through the portion of the second display part BP. On the contrary, the area of the gradation image may be greater than that of the second display part BP. In this case, the portion of the gradation image may be displayed in the first display part FP.

The user perceives a second viewpoint image PV4-I10 substantially the same as the gradation image displayed in the second display part BP at a second viewpoint PV4. The user perceives a second portion image PV3-IB10 as the gradation image at a first viewpoint PV3. However, the second portion image PV3-IB10 is more shifted to the short wavelength than the second viewpoint image PV4-I10.

The user perceives that the image distortion caused by the shape of the display panel DP is caused by the gradation image displayed in the second display part BP. This is because the user perceives the gradation image regardless of the viewpoints PV3 and PV4. Consequently, the gradation image displayed in the second display part BP may compensate for the image distortion caused by the shape of the display panel DP and described with reference to FIG. 8.

The color, brightness, and chroma of the gradation image are set on the basis of the background image displayed in the first display part FP. The control module 10 (refer to FIG. 2) analyzes the image data of the background image displayed in the first display part FP and generates gradation image data, in which at least one of the color, brightness, and chroma is varied, on the basis of the analyzed result. The display panel DP receives the gradation image data and displays the gradation image on the basis of the gradation image data.

As an example, the color of the gradation image displayed in the second display part BP, i.e., the color of the second viewpoint image PV4-I10, may be set on the basis of the color of the background image displayed in the first display part FP. The color of the second viewpoint image PV4-I10 is set to have a wavelength shorter than that of the background image displayed in the first display part FP. For instance, when the background image of the first display part FP has the white or red solid color, the color of the second viewpoint image PV4-I10 is set to have a blue or orange color.

In more detail, when the first display part FP displays the white solid color image, the second display part BP displays the gradation image varied from the white color to the blue color on the first direction DR1 in this case, the user perceives the gradation image varied from the white color to the blue color as the second portion image PV3-IB10 and the second viewpoint image PV4-I10. That is, the user perceives that the image distortion caused by the shape of the display panel DP is caused by the second viewpoint image PV4-I10 since the user perceives the gradation image varied from the white color to the blue color as the image corresponding to the second display part BP regardless of the viewpoints PV3 and PV4.

Meanwhile, when the background image displayed in the first display part FP has a plurality of colors, the color of the gradation image is set by setting a color having the largest area within the colors as the color of the background image or the color of the gradation image is set regardless of the color of the background image displayed in the first display part FP.

The control module 10 may display the gradation image, i.e., the second viewpoint image PV4-I10, in the second display part BP regardless of the image displayed in the first display part FP. The user selects one of various gradation images stored in the memory. The control module 10 applies the gradation image data to the display panel DP such that the selected gradation image is displayed in the second display part BP.

As an example, the color of the second viewpoint image PV4-I10 is varied from a first color to a second color having a wavelength shorter than that of the first color as the distance from the bending axis IL increases. For instance, when the first color is the white or red color, the second color is set to the blue or orange color. In this case, the first display part FP displays the solid color image having a third color different from the first and second colors or displays an image providing specific information.

In more detail, the second viewpoint image PV4-I10 may be the gradation image varied from the white color to the blue color as the distance from the bending axis IL increases on the first direction DR1. The user perceives the gradation image varied from the white color to the blue color as the second portion image PV3-IB10 and the second viewpoint image PV4-I10. That is, the user perceives that the image distortion caused by the shape of the display panel DP is caused by the second viewpoint image PV4-I10 since the user perceives the gradation image varied from the white color to the blue color as the image corresponding to the second display part BP regardless of the viewpoints PV3 and PV4.

As an example, the chroma of the second viewpoint image PV4-I10 increases as the distance from the bending axis IL increases. The increase of the chroma means that a purity of the color increases. For instance, the second viewpoint image PV4-I10 may be a red color image (hereinafter, referred to as a red gradation image) in which the chroma thereof increases as the distance from the bending axis IL increases. In this case, the user perceives the red gradation image shifted to the short wavelength as the second portion image PV4-IB10 and perceives the red gradation image as the second viewpoint image PV4-I10. The user perceives that the image distortion caused by the shape of the display panel DP is caused by the second viewpoint image PV4-I10 since the user perceives the red gradation image regardless of the viewpoints PV3 and PV4.

As an example, the brightness of the second viewpoint image PV4-I10 decreases as the distance from the bending axis IL increases. The decrease of the brightness means that the color becomes dark. For instance, the second viewpoint image PV4-I10 may be a blue color image (hereinafter, referred to as a blue gradation image) in which the brightness thereof decreases as the distance from the bending axis IL increases. In this case, the user perceives the blue gradation image shifted to the short wavelength as the second portion image PV4-IB10 and perceives the blue gradation image as the second viewpoint image PV4-I10. The user perceives that the image distortion caused by the shape of the display panel DP is caused by the second viewpoint image PV4-I10 since the user perceives the blue gradation image regardless of the viewpoints PV3 and PV4. In the present exemplary embodiment, the color of the second viewpoint image PV4-I10 may be varied and may be an achromatic color.

Figure 10:
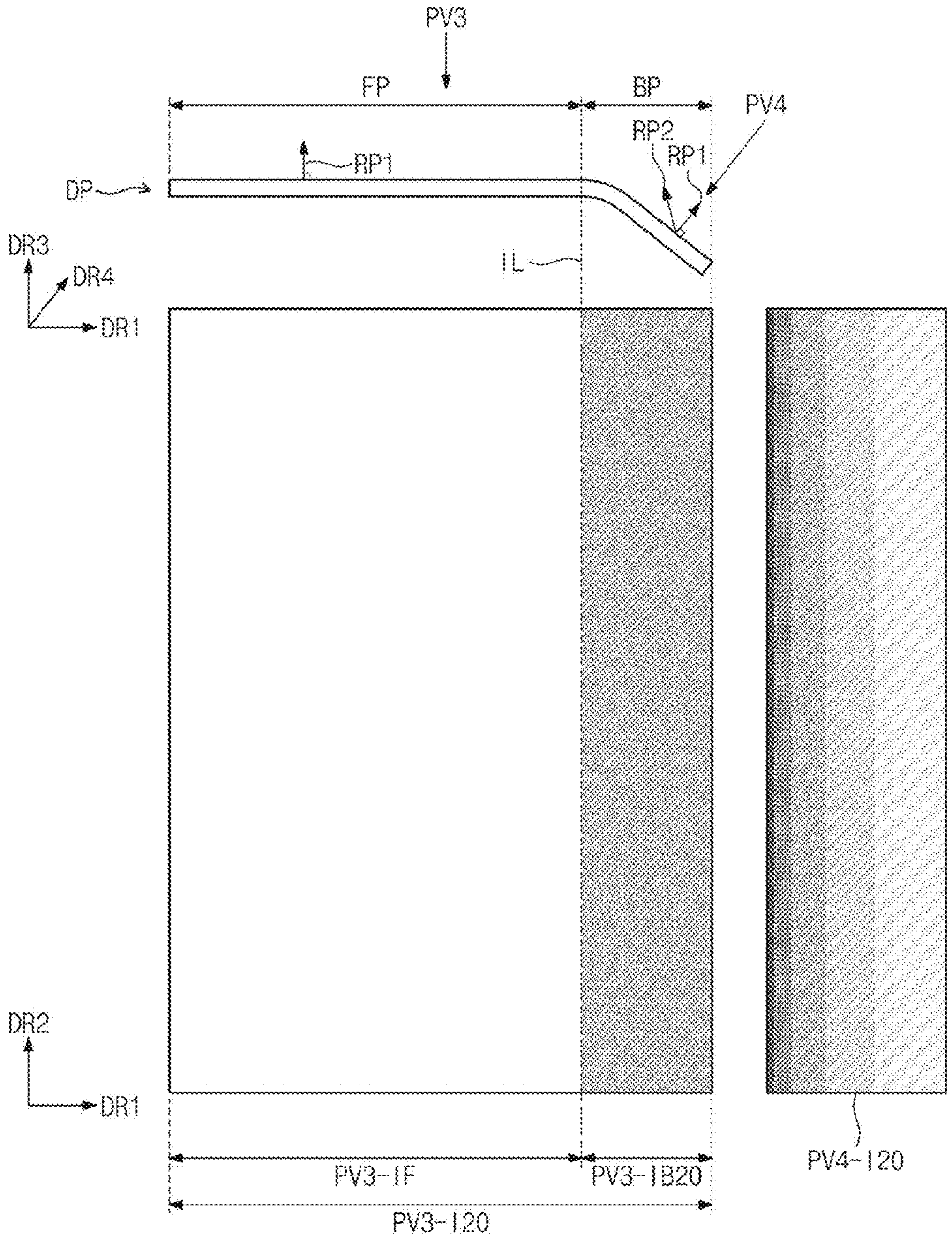
FIG. 10 is a view showing an image in accordance with a viewpoint of a user with respect to a display device according to an exemplary embodiment of the present disclosure.

FIG. 10 is a view showing an image in accordance with a viewpoint of a user with respect to a display device according to an exemplary embodiment of the present disclosure. Hereinafter, a driving method of the display device, which is to compensate for the image distortion, will be described in detail with reference to FIG. 10. In FIG. 10, the same reference numerals denote the same elements in FIGS. 8 and 9, and thus detailed descriptions of the same elements will be omitted.

Referring to FIG. 10, the second display part BP displays the gradation image. The gradation image displayed in the second display part BP is substantially the same as a second viewpoint image PV4-I20. The second viewpoint image PV4-I20 shown in FIG. 10 may be an image obtained by inverting the second viewpoint image PV4-I10 shown in FIG. 9 with respect to the second direction DR2. The second viewpoint image PV4-I20 may be an image varied from the second color to the first color having a wavelength longer than that of the second color as the distance from the bending axis IL increases, an image in which the chroma decreases as the distance from the bending axis IL increases, or an image in which the brightness increases as the distance from the bending axis IL increases.

The user perceives a second portion image PV3-IB20 as a strip image at the first viewpoint PV3. The user perceives the second display part BP as a plane surface at the first viewpoint PV3. When the first display part FP displays the solid color image, the user perceives a first viewpoint image PV3-I20 as an image divided into two different areas.

In particular, when the second viewpoint image PV4-I20 varied to the long wavelength as the distance from the bending axis IL increases is displayed in the second display part BP, the user perceives the second viewpoint image PV3-IB20 as a uniform strip image. For instance, the second viewpoint image PV4-I20 is varied from the orange color to the red color as the distance from the bending axis IL increases. The red color of the second viewpoint image PV4-I20 is shifted to the short wavelength, i.e., the orange color, at the first viewpoint PV3. Accordingly, the second portion image PV3-IB20 is perceived by the user as the orange color strip image.

The color of the second viewpoint image PV4-I20 is independently set or set on the basis of the color of the first portion image PV3-IF. When the second viewpoint image PV4-I20 and the first portion image PV3-IF have the same color, the first viewpoint image PV3-I20 is perceived by the user as the solid color image. For instance, when the first portion image PV3-IF has the orange color and the second viewpoint image PV4-I20 is varied from the orange color having substantially the same wavelength as the first portion image PV3-IF to the red color as the distance from the bending axis IL increases, the user perceives the first viewpoint image PV3-I20 as the orange solid color image.

According to the above, the display device includes a three-dimensional display surface. The first display part that is flat and the second display part that is bent display different information in different directions from each other.

The gradation image displayed in the second display part compensates for the image distortion caused by the shape of the display panel. The user perceives that the image distortion caused by the shape of the display panel is caused by the gradation image.

When the color, brightness, and chroma of the gradation image are varied along the direction crossing the bending axis, various compensation images may be provided to the user. When the color, brightness, and chroma of the gradation image are controlled on the basis of the background image displayed in the first display part, the compensation image that accords with demands of the user may be provided to the user.

Although the exemplary embodiments have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A display device comprising:

an organic light emitting display panel that comprises a first display part configured to display a first image and a second display part bent from the first display part with respect to a bending axis and configured to display a second image; and a control module configured to control images displayed in the first and second display parts, wherein the second image comprises a gradation image and at least one of a color, a brightness, and a chroma of the gradation image is gradually varied along a direction crossing the bending axis, wherein the first display part comprises a first display surface that is flat and the second display part comprises a second display surface that is rounded from the first display surface, and the second display surface is continuous to the first display surface, wherein the first display surface has a greater area than the second display surface, wherein the first image is provided to a user through a first path corresponding to a first resonant length and the second image is provided to the user through a second path corresponding to a second resonant length different from the first resonant length, and wherein the gradation image compensates for the image distortion caused by the difference between the first path and the second path.

2. The display device of claim 1, wherein each of the color, brightness, and chroma of the gradation image is uniform in a direction substantially parallel to the bending axis.

3. The display device of claim 1, wherein the gradation image is a background image of the second display part.

4. The display device of claim 3, wherein the second image further comprises an icon image.

5. The display device of claim 4, wherein the color of the gradation image is gradually varied from a first color to a second color having a wavelength shorter than a wavelength of the first color as a distance from the bending axis increases.

6. The display device of claim 4, wherein the color of the gradation image is gradually varied from a first color to a second color having a wavelength longer than a wavelength of the first color as a distance from the bending axis increases.

7. The display device of claim 4, wherein the chroma of the gradation image increases as a distance from the bending axis increases.

8. The display device of claim 4, wherein the brightness of the gradation image decreases as a distance from the bending axis increases.

9. The display device of claim 3, wherein the first image comprises a background image and an icon image.

10. The display device of claim 9, wherein the control module is configured to set the color of the gradation image on the basis of a color of the background image of the first image.

11. The display device of claim 10, wherein the control module is configured to set the color of the gradation image to allow the color of the gradation image to have a wavelength shorter than a wavelength of the background image of the first image.

12. The display device of claim 11, wherein the color of the background image of the first image is a white color and the color of the gradation image is a blue color.

13. The display device of claim 9, wherein the background image of the first image has a first color that is uniform, a uniform brightness, and a uniform chroma, and the color of the gradation image is gradually varied from the first color to a second color having a wavelength shorter than a wavelength of the first color as a distance from the bending axis increases.

14. The display device of claim 9, wherein the background image of the first image has a first color that is uniform, a uniform brightness, and a uniform chroma, and the color of the gradation image is gradually varied from the first color to a second color having a wavelength longer than a wavelength of the first color as a distance from the bending axis increases.

15. A method of driving a display device, comprising:

displaying a first background image in a first display part of an organic light emitting display panel comprising the first display part and a second display part bent from the first display part with respect to a bending axis; and displaying a gradation image in the second display part as a second background image, wherein at least one of a color, a brightness, and a chroma of the gradation image is gradually varied along a direction crossing the bending axis, wherein the first display part comprises a first display surface that is flat and the second display part comprises a second display surface that is rounded from the first display surface, and the second display surface is continuous to the first display surface, and wherein the first display surface has a greater area than the second display surface, wherein the first background image is provided to a user through a first path corresponding to a first resonant length and the gradation image is provided to the user through a second path corresponding to a second resonant length different from the first resonant length, and wherein the gradation image compensates for the image distortion caused by the difference between the first path and the second path.

16. The method of claim 15, further comprising setting the color of the gradation image on the basis of a color of the first background image.

17. The method of claim 16, wherein the color of the gradation image has a wavelength shorter than a wavelength of the color of the first background image.

18. The method of claim 15, further comprising displaying an icon image in at least one of the first and second display parts.

19. The method of claim 15, wherein the first background image has a first color that is uniform, a uniform brightness, and a uniform chroma, and the color of the gradation image is gradually varied from the first color to a second color having a wavelength shorter than a wavelength of the first color as a distance from the bending axis increases.

* * * * *